(12) United States Patent
Beitelmal et al.

(10) Patent No.: US 7,902,966 B1
(45) Date of Patent: Mar. 8, 2011

(54) MICROCONTROLLER FOR CONTROLLING AN ACTUATOR

(75) Inventors: Abdlmonem H. Beitelmal, Los Altos, CA (US); Wayne Mack, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 11/764,410

(22) Filed: Jun. 18, 2007

(51) Int. Cl.
| | |
|---|---|
| G05B 11/01 | (2006.01) |
| G05B 13/00 | (2006.01) |
| G05B 15/00 | (2006.01) |
| G08B 21/00 | (2006.01) |
| H02J 3/14 | (2006.01) |
| F24F 7/00 | (2006.01) |
| G06F 1/00 | (2006.01) |
| G06F 11/30 | (2006.01) |
| G05D 23/00 | (2006.01) |
| G05D 3/12 | (2006.01) |
| G05D 1/02 | (2006.01) |
| G05D 1/10 | (2006.01) |

(52) U.S. Cl. .............. 340/310.11; 340/635; 340/660; 340/686.1; 307/31; 236/49.3; 713/340; 700/13; 700/20; 700/22; 700/277; 700/291; 700/298; 700/300; 700/302

(58) Field of Classification Search .................. 700/13, 700/20, 22, 276, 277, 291, 297, 298, 299, 700/300, 302; 702/188; 713/300, 340; 236/49.3; 307/31; 340/310.11, 606, 635, 657, 660, 340/686.1, 686.6; 454/239
See application file for complete search history.

(56) References Cited

U.S. PATENT DOCUMENTS

| | | | | |
|---|---|---|---|---|
| 3,788,386 | A | * | 1/1974 | Demaray ..................... 165/216 |
| 4,497,031 | A | * | 1/1985 | Froehling et al. ............ 700/276 |
| 4,646,964 | A | * | 3/1987 | Parker et al. ................ 236/49.3 |
| 5,417,077 | A | * | 5/1995 | Jeffery et al. ................... 62/180 |
| 5,493,194 | A | * | 2/1996 | Damiano et al. ............. 318/575 |
| 5,733,188 | A | | 3/1998 | Jacob |
| 5,810,245 | A | * | 9/1998 | Heitman et al. ............. 236/49.3 |
| 5,826,654 | A | * | 10/1998 | Adnan et al. ............. 166/250.01 |
| 5,944,098 | A | * | 8/1999 | Jackson ....................... 165/217 |
| 6,055,144 | A | * | 4/2000 | Reid ............................. 361/64 |
| 6,070,114 | A | * | 5/2000 | Fendt et al. ................... 701/45 |
| 6,095,867 | A | * | 8/2000 | Brandt et al. ........... 439/620.09 |
| 6,465,908 | B1 | * | 10/2002 | Karuppana et al. ............ 307/31 |
| 6,675,302 | B2 | * | 1/2004 | Ykema ......................... 713/300 |

(Continued)

FOREIGN PATENT DOCUMENTS

WO   WO 2008156741 A2 * 12/2008

OTHER PUBLICATIONS

Awtrey, D., "Transmitting Data and Power Over a One-Wire Bus", Sensors, The Journal of Applied Sensing Technology, Feb. 1997.

*Primary Examiner* — Crystal J Barnes-Bullock

(57) ABSTRACT

A microcontroller for controlling an actuator includes a single wire controller configured to receive data and power from a base station through a single wire bus, where the single wire bus is part of a power and signal cable configured to connect the microcontroller to the base station. The microcontroller also includes a peripheral interface controller (PIC) microcontroller configured to transmit data signals to and receive data signals from the single wire controller, where the PIC microcontroller is configured to receive reduced voltage level from a power wire of the power and signal cable, to measure the voltage level and to communicate the measured voltage level to the base station through the single wire bus.

9 Claims, 7 Drawing Sheets

U.S. PATENT DOCUMENTS

| | | | |
|---|---|---|---|
| 6,882,125 B2 * | 4/2005 | Kameda et al. | 318/561 |
| 6,995,658 B2 * | 2/2006 | Tustison et al. | 375/219 |
| 7,006,949 B2 | 2/2006 | Moore | |
| 7,086,603 B2 | 8/2006 | Bash et al. | |
| 7,197,433 B2 * | 3/2007 | Patel et al. | 702/188 |
| 7,272,945 B2 * | 9/2007 | Bash et al. | 62/180 |
| 7,475,558 B2 * | 1/2009 | Perry | 62/180 |
| 7,477,028 B2 * | 1/2009 | Bokusky et al. | 318/273 |
| 2005/0023363 A1 * | 2/2005 | Sharma et al. | 236/49.3 |
| 2005/0138440 A1 * | 6/2005 | Barr et al. | 713/300 |
| 2005/0208888 A1 | 9/2005 | Moore et al. | |
| 2005/0278071 A1 * | 12/2005 | Durham | 700/276 |
| 2006/0091229 A1 | 5/2006 | Bash et al. | |
| 2006/0242908 A1 * | 11/2006 | McKinney | 49/280 |
| 2007/0167086 A1 * | 7/2007 | Tolli | 439/712 |
| 2007/0235440 A1 * | 10/2007 | Gu et al. | 219/482 |
| 2008/0244104 A1 * | 10/2008 | Clemente | 710/11 |
| 2009/0173473 A1 * | 7/2009 | Day | 165/67 |
| 2009/0187284 A1 * | 7/2009 | Kreiss et al. | 700/291 |
| 2010/0105311 A1 * | 4/2010 | Meneely, Jr. | 454/239 |

* cited by examiner

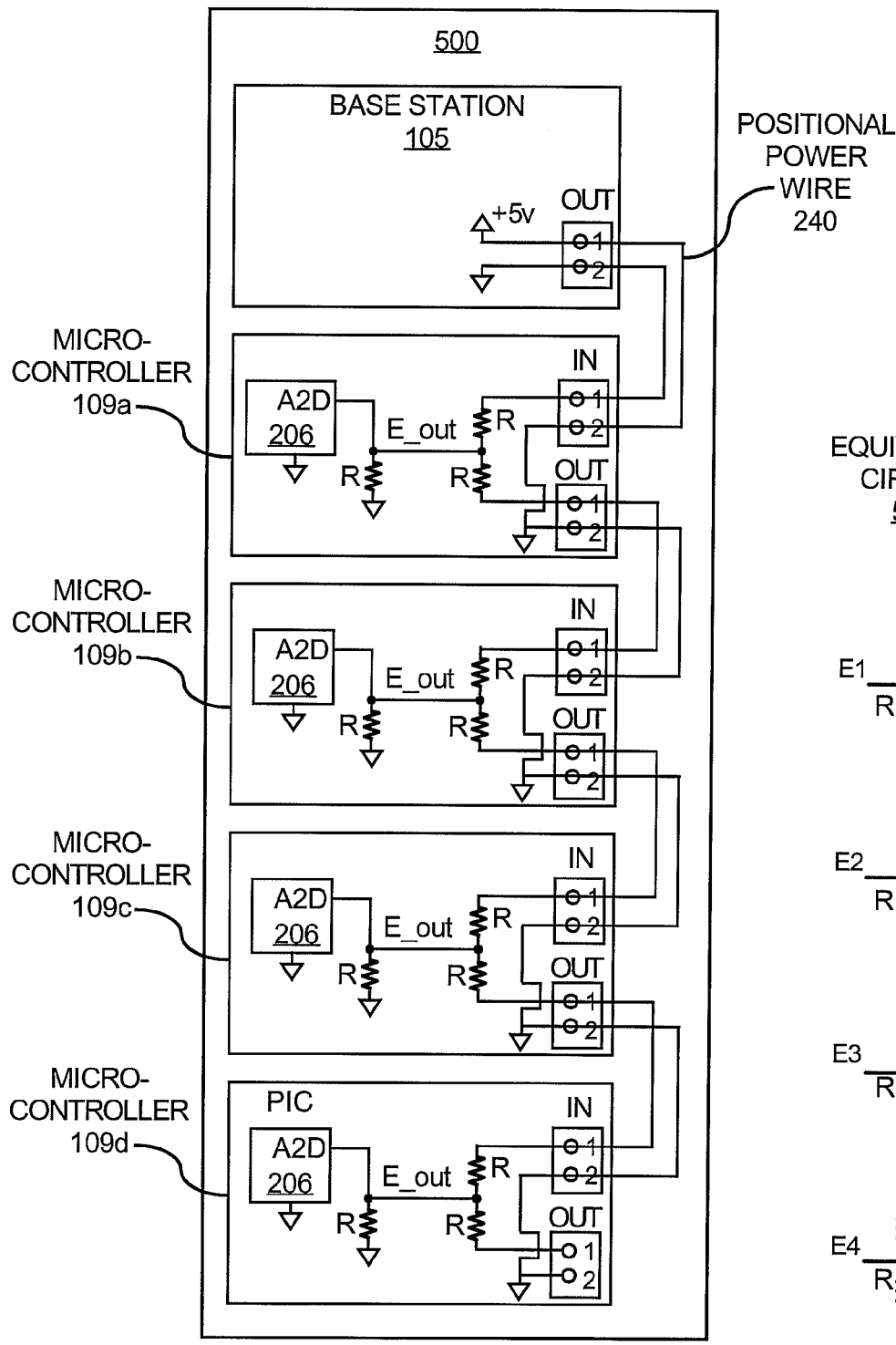
*FIG. 5A*      *FIG. 5B*

MICROCONTROLLER FOR CONTROLLING AN ACTUATOR

BACKGROUND

A data center may be defined as a location, for instance, a room that houses computer systems arranged in a number of racks. The computer systems typically dissipate relatively significant amounts of heat during the operation of the respective components. For example, a typical computer system comprising multiple microprocessors may dissipate approximately 250 W of power. Thus, a rack containing forty (40) computer systems of this type may dissipate approximately 10 KW of power.

To dissipate the heat generated by the computer systems, data centers are typically equipped with a raised floor with vent tiles configured to provide cool air to the computer systems from a pressurized plenum in the space below the raised floor. These vent tiles often contain manually adjustable dampers for varying the flow rate of cool air there through. However, because these vent tiles typically are not configured for remote controlled operations, they are typically unable to dynamically provision the data center with cooling resources. This may lead to inefficiencies in both cooling of the computer systems as well as in the operations of air conditioning units, which wastes energy and financial resources.

In other instances, automated vent tiles have been used in data centers to generally enable remote actuation of the vent tiles via feedback control algorithms. Conventional automated vent tiles are typically composed of relatively complex and bulky systems, which require a variety of electronic circuitry to control the vent tiles, which are associated with relatively high costs.

An efficient and relatively inexpensive system for controlling the vent tiles to enable relatively accurate airflow delivery is therefore be desirable.

BRIEF DESCRIPTION OF THE DRAWINGS

Features of the present invention will become apparent to those skilled in the art from the following description with reference to the figures, in which:

FIGS. 3A, 4A, and 5A, respectively show block diagrams of various systems for identifying locations of microcontrollers along a power and signal cable, according to an embodiment of the invention;

FIGS. 3B, 4B, and 5B, respectively show equivalent circuits to the block diagrams depicted in FIGS. 3A, 4A, and 5A, according to an embodiment of the invention;

DETAILED DESCRIPTION

Figure 1:
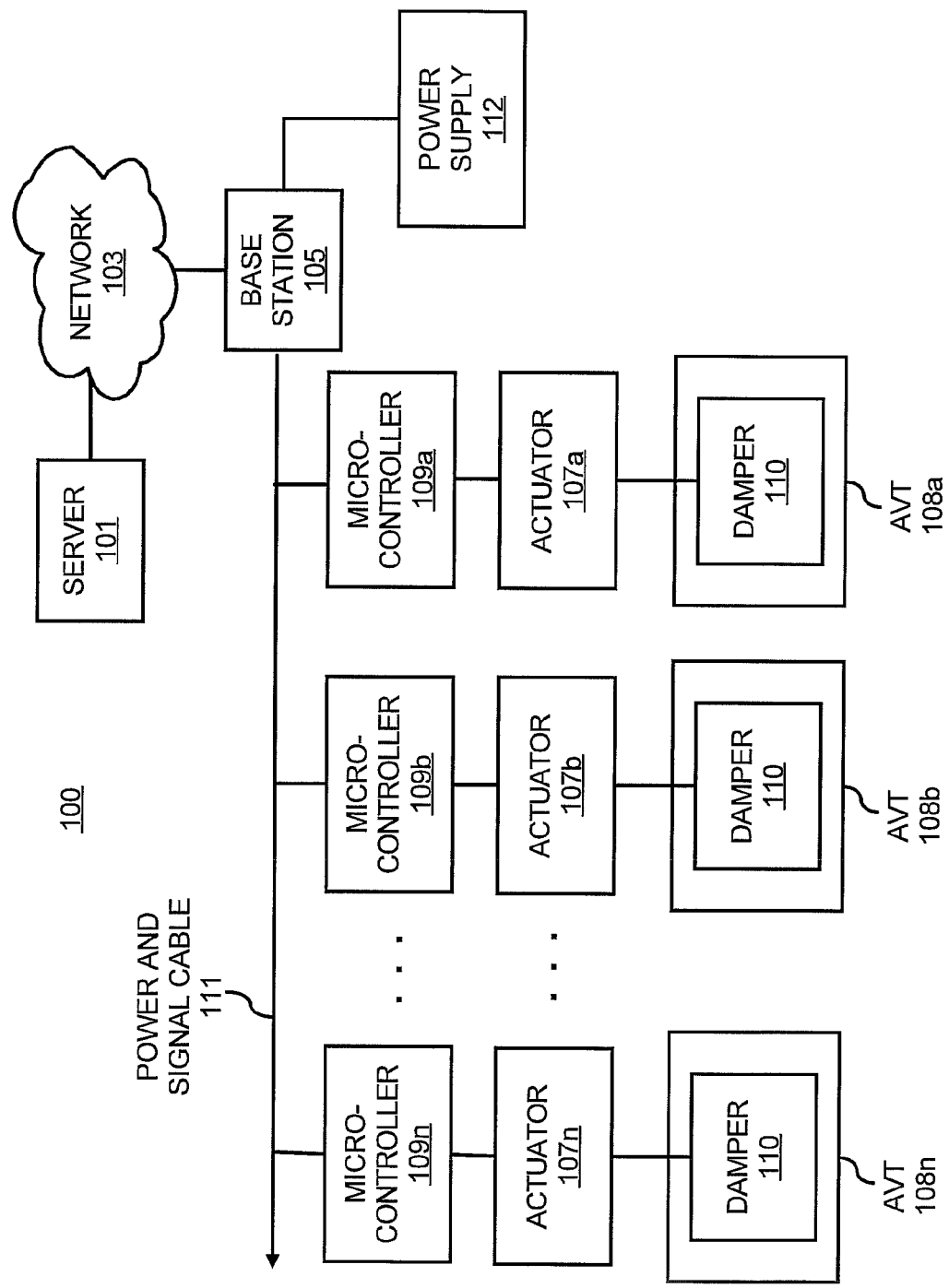
FIG. 1 shows a block diagram of a control system for controlling one or more actuators, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a microcontroller and a method for controlling an actuator with the microcontroller. The term "actuator," as used herein, generally refers to any reasonably suitable electrical or mechanical device for controlling the movement of other devices or components. For example, actuators include motors, which convert an input signal into motion. The actuators described herein may be used to control the movements of any reasonably suitable devices, including, but not limited to, dampers of adaptive vent tiles (AVTs), which may be employed in data centers to dynamically modulate and control the flow of cooling fluid.

The term "fluid," as used herein, refers to either or both gasses and liquids. As such, the AVTs may be operated to control the flow of cooling fluid supplied to computer systems house in a data center. For example, the AVTs may be automatically adjustable to open and close to thereby vary the flow of cooling fluid through the AVTs. The AVTs may open and close through operation of dampers, which are movable components of the AVT designed to physically vary the flow of cooling fluid through the AVT. The dampers may take a variety of forms and include, for example, a series of elongated blades, sliding components, folding components, etc., any of which may be used in conjunction with the AVTs described herein.

The actuators may be controlled by one or more microcontrollers. The microcontrollers each comprises electronic circuitry for controlling the actuators and communicating with other devices. For example, the microcontrollers may receive signals from, and transmit signals to, a base station, which may comprise a processing device configured to communicate with a plurality of microcontrollers and a server, as described in greater detail below.

The microcontroller may be connected to the base station via a power and signal cable. The power and signal cable includes a plurality of wires for supplying power to the microcontroller. The power and signal cable also includes a single wire configured to enable both power and data signals to be communicated to the microcontroller. The single wire may utilize One-Wire™ technology available from Dallas Semiconductor, Inc., of Dallas, Tex. The single wire allows both power and communication signals to be transmitted over a single cable by drawing parasitic power from a data line.

The use of the power and signal cable allows for implied connectivity because fewer components are required to operate and communicate with the microcontroller. Moreover, this simplified system renders the microcontrollers to be relatively easy and inexpensive to manufacture and deploy, thereby facilitating the deployment of large numbers of microcontrollers. Thus, a large number of actuators may be individually monitored and controlled through a number of separate microcontrollers, which allows for a relatively high level of granularity in the control of cooling fluid delivery to multiple areas in a data center.

With particular reference now to FIG. 1, there is shown a simplified block diagram of a control system 100 for controlling one or more actuators 107*a*-107*n*, according to an example. Although particular reference has been made herein below to the control system 100 as including particular features, it should be understood that the control system 100 may include additional components and that some of the components described may be removed and/or modified without departing from a scope of the control system 100.

The control system 100 is illustrated as including a server 101 and a base station 105 in communication with the server 101 via a network 103. The base station 105 is depicted as being connected to a plurality of microcontrollers 109a-109n via a power and signal cable 111. In addition, each of the microcontrollers 109a-109n is depicted as controlling a respective actuator 107a-107n. Moreover, each of the actuators 107a-107n is depicted as controlling dampers 110 of respective AVTS 108a-108n It should be understood that the control system 100 may include any reasonably suitable number of microcontrollers 109a-109n and actuators 107a-107n. Similarly, the control system 100 may operate without one or more of the components depicted in FIG. 1, such as the base station 105 or the server 101, as will be descried in greater detail below.

The server 101 may be any reasonably suitable computing system capable of monitoring and/or controlling the actuators 107a-107n. In this regard, the server 101 may comprise a computing device having software for monitoring and controlling the dampers 110 of the AVTs 108a-108n associated with the actuators 107a-107n. For instance, the server 101 may comprise, or may be used in conjunction with the systems and methods described in commonly assigned and co-pending U.S. patent application Ser. Nos. 10/976,786, filed Nov. 1, 2004, entitled "Control of Vent Tiles Correlated With a Rack," 10/960,573, filed Oct. 8, 2004, entitled "Correlation of Vent Tiles and Racks", and 10/960,574, filed Oct. 8, 2004, entitled "Correlation of Vent Tile Settings and Rack Temperatures", the disclosures of which are hereby incorporated by reference in their entireties. Thus, for instance, the server 101 may receive a plurality of inputs, including input associated with heat-generating components (not shown). The server 101 may automatically determine if any of the actuators 107a-107n should be controlled to open or close the dampers 110 of respective AVTs 108a-108n in order to vary the delivery of cooling fluid to variously located heat-generating components.

The network 103 generally facilitates communication between the server 101 and the base station 105 and may comprise any reasonably suitable network, such as the Internet, a wide area network (WAN), a local area network (LAN), etc., comprising a wired or a wireless structure. The base station 105 may comprise hardware, software, a combination of hardware and software, and/or firmware for communicating with the microcontrollers 109a-109n and the server 101. In one example, the base station 105 may comprise a tiny Internet interface (TINI) board available from Dallas Semiconductor, Inc., of Dallas, Tex. However, the base station 105 may include any reasonably suitable electronic circuitry for communicating with the microcontrollers 109a-109n. In this regard, the base station 105 may receive communications from the server 101 to instruct one or more of the microcontrollers 109a-109n to control one or more of the actuators 107a-107n. Thus, the base station 105 may implement instructions from the server 101 to control the dampers 110 of respective AVTs 108a-108n and vary the flow of cooling fluid through the respective AVTs 108a-108n.

The base station 105 may also receive and process communications from the microcontrollers 109a-109n and may transmit the communications from the microcontrollers 109a-109n to the server 101. For example, the microcontrollers 109a-109n may transmit information to the base station 105 that may be processed to determine the locations of the microcontrollers 109a-109n, and thus, the AVTs 108a-108n associated with the microcontrollers 109a-109n. The information comprises any data, which the base station 105 and/or the server 101 may use to determine the positions of the microcontrollers 109a-109n along the power and signal cable 111. For instance, the information may include the voltage of the electrical energy that each of the microcontrollers 109a-109n is receiving from the power and signal cable 111.

More particularly, an electric current supplied from a power supply 112, such as, an AC or a DC power source, may be supplied to the microcontroller 109a-109n through a plurality of wires contained in the power and signal cable 111 from the base station 105. The microcontrollers 109a-109n may be serially connected to the power and signal cable 111. Each microcontroller 109a-109n may receive a different amount of power, which may be measured in voltage, depending upon the location of the microcontroller 109a-109n along the single conductor bus 111 through use of resistors as discussed herein below. As also discussed below, each of the microcontrollers 109a-109n may be equipped with a device that measures the voltage supplied into each of the microcontrollers 109a-109n. In addition, the microcontrollers 109a-109n also include respective devices configured to transmit the measured voltages to the base station 105.

The base station 105 may receive the measured voltages from the microcontrollers 109a-109n and may determine their relative locations along the power and signal cable 111 based upon the measured voltages. More particularly, for instance, the base station 105 may compare the voltages received from the microcontrollers 109a-109n to determine the bit position of each of the microcontrollers 109a-109n along the power and signal cable 111. By way of example, the base station 105 may determine that the microcontroller 109a receiving the highest amount of voltage is located closest to the base station 105 and that the microcontroller 109n receiving the least amount of voltage is located the farthest from the base station 105. A person having ordinary skill in the art will appreciate that while voltage has been described is this example as the transmitted data, other data may also be used as positional data. For instance, any other reasonably suitable electrical measurement, such as resistance, may be used to determine the positions of the microcontrollers 109a-109n without departing from a scope of the system 100.

The microcontrollers 109a-109n are depicted in FIG. 1 as being associated with respective actuators 107a-107n. The phrase "associated with," as used herein may be defined to include that the microcontrollers 109a-109n have the abilities to respectively control the actuators 107a-107n. For instance, the microcontrollers 109a-109n may be formed as parts of respective AVTs 108a-108n or other components (not shown), yet remain associated with the actuators 107a-107n via an electrical connector, such as a wire or cable. In another example, the microcontrollers 109a-109n may communicate with the actuators 107a-107n wirelessly, by radio frequency (RF) signals or other wireless means, for example.

Similarly, although each actuator 107a-107n has been depicted as being controlled by a dedicated microcontroller 109a-109n, the control system 100 may operate with at least one of the microcontrollers 109a-109n controlling two or more actuators 107a-107n. In this example, a microcontroller 109a may be configured to control a plurality of actuators 107a and 107b to operate separately or in unison.

Moreover, as set forth above, the control system 100 may include any reasonably suitable number of actuators 107a-107n, which may be controlled individually or in groups. For example, one of the actuators 107a may be controlled to close the damper 110 of an AVT 108a, while another of the actuators 107b may be controlled to open the damper 110 of an AVT 108*b*. Alternatively, or in addition thereto, two or more of the actuators 107*a* and 107*b* may be controlled substantially simultaneously to move in a similar manner.

It should be understood that while the terms "open" and "closed" are used herein to refer to the positions of the dampers 110, as controlled by the actuators 107*a*-107*n*, the actuators 107*a*-107*n* may alter the positions of any moving component of any reasonably suitable device to any intermediate positions between fully opened and fully closed. For example, the dampers 110 of the AVTs 108*a*-108*n* may include a plurality of movable blades, which are configured to move between any reasonably suitable number of positions between fully open, or allowing a maximum amount of fluid to flow through the AVT, and fully closed, or allowing a minimum amount of fluid to flow through the AVT. In one example, the blades may have 64 positions between fully open and fully closed. This individualized control of the dampers 110 to a variety of specific positions eliminates labor intensive manual adjustment of the dampers, saves energy during low heat loads, and adjusts and balances fluid distribution on demand.

Control signals, which may include communications instructing the actuators 107*a*-107*b* to move the dampers 110, may originate at the server 101, at the base station 105, or at the microcontrollers 109*a*-109*n*. For example, the server 101 may comprise a computer system monitoring heat-generation and cooling fluid distribution in a data center. The server 101 may determine that cooling fluid flow through one or more AVTs should be varied. In this example, the server 101 may transmit a control signal to the base station 105 via the network 103. The base station 105 may receive the control signals and may determine how to implement the requested change. For example, the base station 105 may determine the positions of one or more microcontrollers 109*a*-109*n* on the single conductor bus 111 that will best effectuate the change requested by the server 101. The base station 105 may also determine the current positions of the dampers 110 which have been identified to be moved and the new positions that the dampers 110 are to be moved. Thus, the base station 105 may transmit control signals to the microcontrollers 109*a*-109*n* instructing them to control actuators 107*a*-107*n* as determined.

As mentioned above, the control signal initiated by the server 101 may be automatic or manual. That is, the server 101 may comprise a computer system, which automatically makes a determination that one or more actuators 107*a*-107*n* should be moved. However, control signals may also be generated by user input. For example, the server 101 may include I/O devices, such as a keyboard, mouse, touch screen, etc., which a user may manipulate to provide user input. The server 101 may also include a graphical user interface (GUI), with which the user may interact to provide user input in varying operations of the one or more actuators. The GUI may include any reasonably suitable feature for receiving and displaying data, such as slider bars, graphs, charts, text boxes, etc.

Alternatively, or in addition thereto, the control signals may be initiated by the base station 105 or the microcontrollers 109*a*-109*n*. For example, the microcontrollers 109*a*-109*n* and/or the base station 105 may be programmed to alter the positions of the actuators 107*a*-107*n* at certain times or time intervals. In this regard, the microcontrollers 109*a*-109*n* and/or the base station 105 may include a timing mechanism, such as an internal clock or the like. Thus, for instance, the microcontrollers 109*a*-109*n* may close or reduce the openings in the dampers 110 of one or more AVTs 108*a*-108*n* during off-peak hours, to thereby conserve energy when less cooling fluid is needed. In another example, the microcontrollers 109*a*-109*n* and/or the base station 105 may initiate control signals upon the receipt of input from sensors, as discussed below with respect to FIG. 2.

Figure 2:
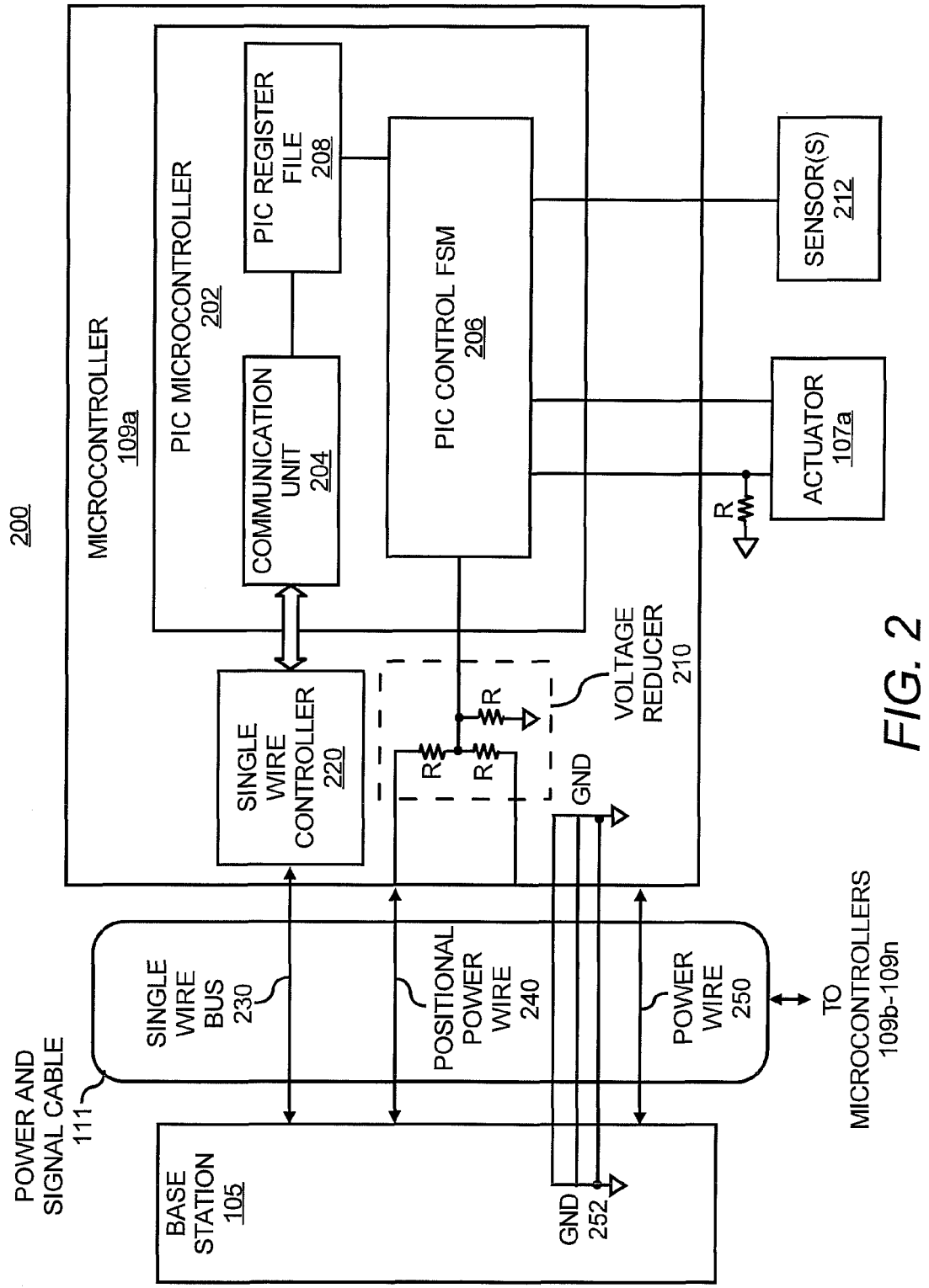
FIG. 2 shows a block diagram of a control system for controlling one or more actuators that is similar to and more detailed than the block diagram depicted in FIG. 1, according to an embodiment of the invention.

With particular reference now to FIG. 2, there is shown a block diagram of a control system 200 for controlling an actuator 107*a*, according to another example. The control system 200 depicted in FIG. 2 is similar to the control system 100 depicted in FIG. 1, but provides a more detailed depiction of a microcontroller 109*a* and its connections to the base station 105 through the power and signal cable 111. Although particular reference has been made herein below to the control system 200 as including particular features, it should be understood that the control system 200 may include additional components and that some of the components described may be removed and/or modified without departing from a scope of the control system 200. In addition, it should be understood that the description of the control system 200 applies to the remaining microcontrollers 109*b*-109*n*.

The microcontroller 109*a* is illustrated as including a peripheral interface controller (PIC) microcontroller 202 and a single wire controller 220. The PIC microcontroller 202 may comprise any reasonably suitable microcontroller configured to perform the various functions described herein. In addition, the single wire controller 220 may comprise any reasonably suitable controller that enables both power and data signals to be communicated between the microcontroller 109*a* and the base station 105 over a single wire bus 230. According to an example, the single wire bus 230 may comprise a One-Wire™ line available from Dallas Semiconductor, Inc. In addition, the single wire controller 220 may comprise a DS2408 chip configured to operate with the One-Wire™ line, also available from Dallas Semiconductor, Inc.

In one regard, the single wire controller 220 is configured to receive power, such as, parasitic power, and to also communicate data to and from the base station over the single wire bus 230. As such, the single wire bus 230 may be located within the power and signal cable 111 connecting the base station 105 to the microcontroller 109*a*. The single wire controller 220 is also configured to communicate data signals to and from the PIC microcontroller 202 through a communication unit 204. The communication unit 204 may comprise, for instance, a finite state machine (FSM) that provides an interface between the PIC microcontroller 202 and the single wire controller 220 to thereby enable communication of data between the PIC microcontroller 202 and the single wire controller 202.

The PIC microcontroller 202 also includes a PIC control FSM 206 configured to receive inputs from a plurality of inputs as well as to communicate instructions to one or more outputs. As shown in FIG. 2, the PIC control FSM 206 is configured to receive input from a voltage reducer 210, which may comprise the a circuit having a the configuration of resistors (R) depicted therein. The voltage reducer 210 may have alternative configurations as discussed with respect to the figures below.

In addition, one of the microcontrollers 109*a* of a group of microcontrollers 109*a*-109*n*, for instance, the microcontroller 109*a* positioned the closest to the base station 105, may not be equipped with the voltage reducer 210. As such, the first microcontroller 109*a* may have a configuration that differs from the configurations of the other microcontrollers 109*b*-109*n*. As described in greater detail herein below, the voltage reducer 210 may operate to sequentially reduce the voltages supplied to microcontrollers 109*b*-109*n* located further away from the base station 105. The base station 105 may use the sequentially changing voltages to determine the locations of the microcontrollers 109*a*-109*n* along the power and signal cable 111. The base station 105 may also correlate the locations of the microcontrollers 109a-109n with associated actuators 107a-107a and AVTs 108a-108n to determine which of the actuators 107a-107n are to be operated to achieve desired results.

In any regard, the PIC control FSM 206 may be configured to measure the voltage supplied through the power wire 240 and received from the base station 105 through one of the wires contained in the power and signal cable 111. The PIC control FSM 206 may communicate the power level to the PIC register file 208, where the power level information may be registered. The power level information may also be communicated to the base station 105 through the communication unit 204 and the single wire controller 220.

The microcontroller 109a may also receive power through another power wire 250 in the power and signal cable 111. As also shown in FIG. 2, the power and signal cable 111 may also include at least one ground wire 252 (three ground wires 252 are shown) to ground the single wire bus 230, a positional power wire 240 and a power wire 250. As discussed below, the positional power wire 240 may provide sufficient energy to enable the positions of the microcontrollers 109a-109n to be determined along the power and signal cable 111. In addition, the power wire 250 may supply power to the microcontrollers 109a-109n and the PIC microcontroller 202.

The microcontroller 109a may use the power from the power wire 250 to operate the components of the PIC microcontroller 202 as well as other input and output devices associated with the PIC microcontroller 202. More particularly, for instance, the PIC control FSM may supply power to the actuator 107a to thereby vary a position of a damper 110 in the AVT 108a.

In another example, the PIC control FSM 206 may supply power to one or more sensors 212, which may include any reasonably suitable devices for detecting a condition. For example, the sensors(s) 212 may include light sensors, temperature sensors, airflow sensors, etc., which detect environmental conditions, such as an amount of light, temperature, speed and direction of airflow, etc. The control system 200 may include any reasonably suitable number of sensor(s) 210 and any combination of different types of sensor(s) 212. For instance, the control system 200 may include one or more sensor(s) 212 associated with each actuator 107a or with each device associated with the actuators 107a-107n. For example, the actuators 107a-107n may control the movable dampers 110 of the AVTs 108a-108n. Therefore, each AVT 108a-108n may include one or more sensor(s) 212. In addition, the sensor (s) 212 may be unassociated with any particular devices or associated with devices not shown in FIGS. 1 and 2, such as a heat-generating component in a data center.

In any regard, the PIC control FSM 206 may receive the one or more conditions detected by the one or more sensors 212. In addition, the PIC control FSM 206 may store the detected conditions in the PIC register file 208. According to a first example, the PIC microcontroller 202 may employ the detected conditions in determining how the actuator 107a is to be operated. By way of example, the sensor 212 may comprise a light sensor and the PIC microcontroller 202 may receive input from the sensor 212 indicating that the lights in the data center have been turned off, as may occur during off-peak hours. From this input, the PIC microcontroller 202 may determine that the actuator 107a should be controlled to reduce an opening in an AVT 108a by closing its damper 110, to thereby reduce the flow of cooling fluid.

In another example, the sensor 212 may include a motion sensor, such as an accelerometer. The motion sensor 212 may be associated with a moving component, such as the damper 110 of the AVT 108a and, thus, may measure the position of the damper 110, which may be used to calculate the level of airflow supplied through the AVT 108a. According to an example, the motion sensor 212 may be self-configured based upon a maximum and a minimum position of the damper 110. To perform the self-configuration, the actuator 107a may move the damper 110 to a maximum open position, such as a fully open position, and the PIC control FSM 206 may receive a reading from the motion sensor 212. The actuator 107a may then move the damper 110 to a minimum open position and the PIC control FSM 206 may receive another reading from the motion sensor 212. The PIC microcontroller 202 may the determine the range of openings that the damper 110 may be positioned.

According to another example, the PIC microcontroller 202 may communicate the conditions detected by the sensor 212 to the base station 105 through the single wire bus 230, and the base station 105 may determine how the actuator 107a is to be operated. In this example, the base station 105 may also communicate instructions back to the PIC microcontroller 202, which may be followed in controlling the actuator 107a.

The base station 105 may also receive other data, such as, names, addresses, identification numbers, etc., of the microcontrollers 109a-109n through the single wire bus 230. For example, each of the microcontrollers 109a-109n may be assigned with a unique identifier that it transmits to the base station 105. Thus, the base station 105 may correlate the relative positions of the microcontrollers 109a-109n along the power and signal cable 111 with their respective identifiers. The microcontrollers 109a-109n may also transmit information regarding the actuators 107a-107n associated with the microcontrollers 109a-109n and devices associated with the actuators 107, such as the AVTs 108a-108n, to the base station 105.

The transmission of the voltage levels received by the microcontrollers 109a-109n from the microcontrollers 109a-109n to the base station 105 may facilitate automatic self-configuration of the microcontroller 109a-109n positions. That is, for instance, as microcontrollers 109a-109n are initially placed, removed from, added to, relocated, etc., along the power and signal cable 111, the microcontrollers 109a-109n may automatically transmit their received voltage levels, as well as their identification information, to the base station 105.

This process may occur automatically as microcontrollers 109a-109n are activated, at set time intervals, in response to a query from the base station 105 or server 101, manually by a user, etc. Thus, the control system 100 may automatically self-configure the microcontroller 109a-109n positions, such that the base station 105 may immediately determine the identities and positions of the microcontrollers 109a-109n connected to the power and signal cable 111.

The microcontrollers 109a-109n may have various configurations to generally vary the voltage levels among the microcontrollers 109a-109n positioned along a power and signal cable 111. Examples of various suitable configurations are described with respect to FIGS. 3A-5B below.

Figures 3A, 3B:
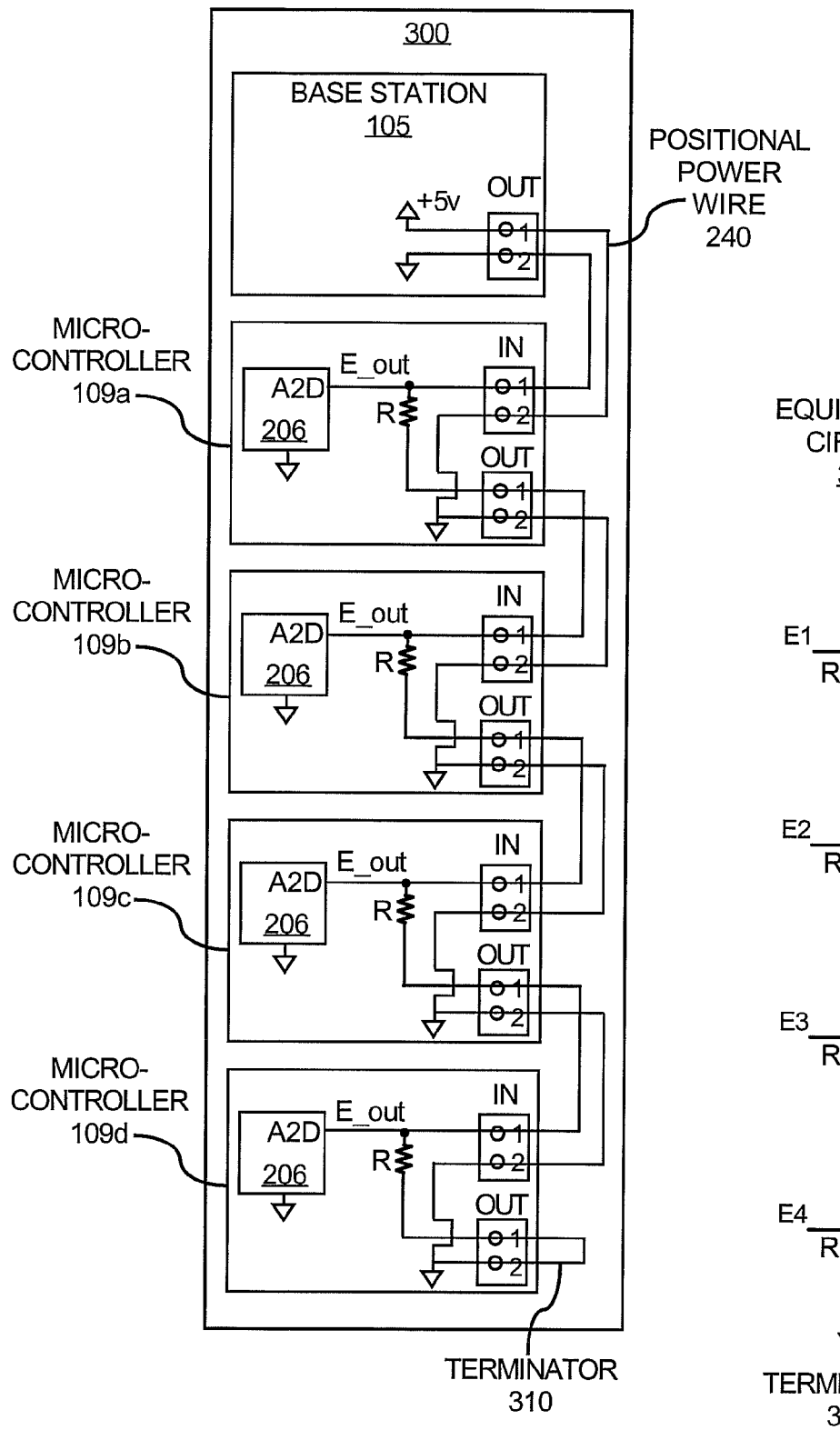

With reference first to FIG. 3A, there is shown a block diagram of a system 300 for identifying locations of the microcontrollers 109a-109n along the power and signal cable 111, according to an example. In addition, FIG. 3B depicts an equivalent circuit 320 to the system 300 depicted in FIG. 3A. As shown in FIG. 3A, each of the PIC control FSMs 206 is depicted as including a pair of inputs ("in") and a pair of outputs ("out"), with an analog-to-digital ("A2D") converter configured to receive power from one of the positional power wires 240. In addition, the PIC control FSM 206 of the microcontroller 109a receives the positional power wire 240 of the power and signal cable 111 from the base station 105 through the inputs.

A resistor ("R") is provided along one of the positional power wires 240 between the inputs and the outputs of the PIC control FSM 206. In addition, the positional power wires 240 from outputs of the microcontroller 109a are supplied into the inputs of the next microcontroller 109b along the positional power wire 240, or the power and signal cable 111. Another resistor ("R") is provided in one of the positional power wires 240 between the inputs and the outputs of the PIC control FSM 206 of the next microcontroller 109b. This configuration is repeated for the remaining microcontrollers 109c and 109d.

The resistors ("R") positioned along the positional power wire 240 sequentially cause the voltages measured by the A2D converters to be reduced as the voltages are measured from the microcontroller labeled 109a to the microcontroller labeled 109d. As discussed above, the measured voltages may be communicated back to the base station 105, and the base station 105 may determine the relative positions of the microcontrollers 109a-109d along the positional power wire 240 by comparing the respective voltages. The microcontroller 109a-109n positions may be correlated with the AVTs 108a-108n to also determine their locations.

After the positional power wire 240 leaves the microcontroller labeled 109d, the positional power wire 240 ends at a terminator 310, as also shown in FIGS. 3A and 3B.

Figures 4A, 4B:
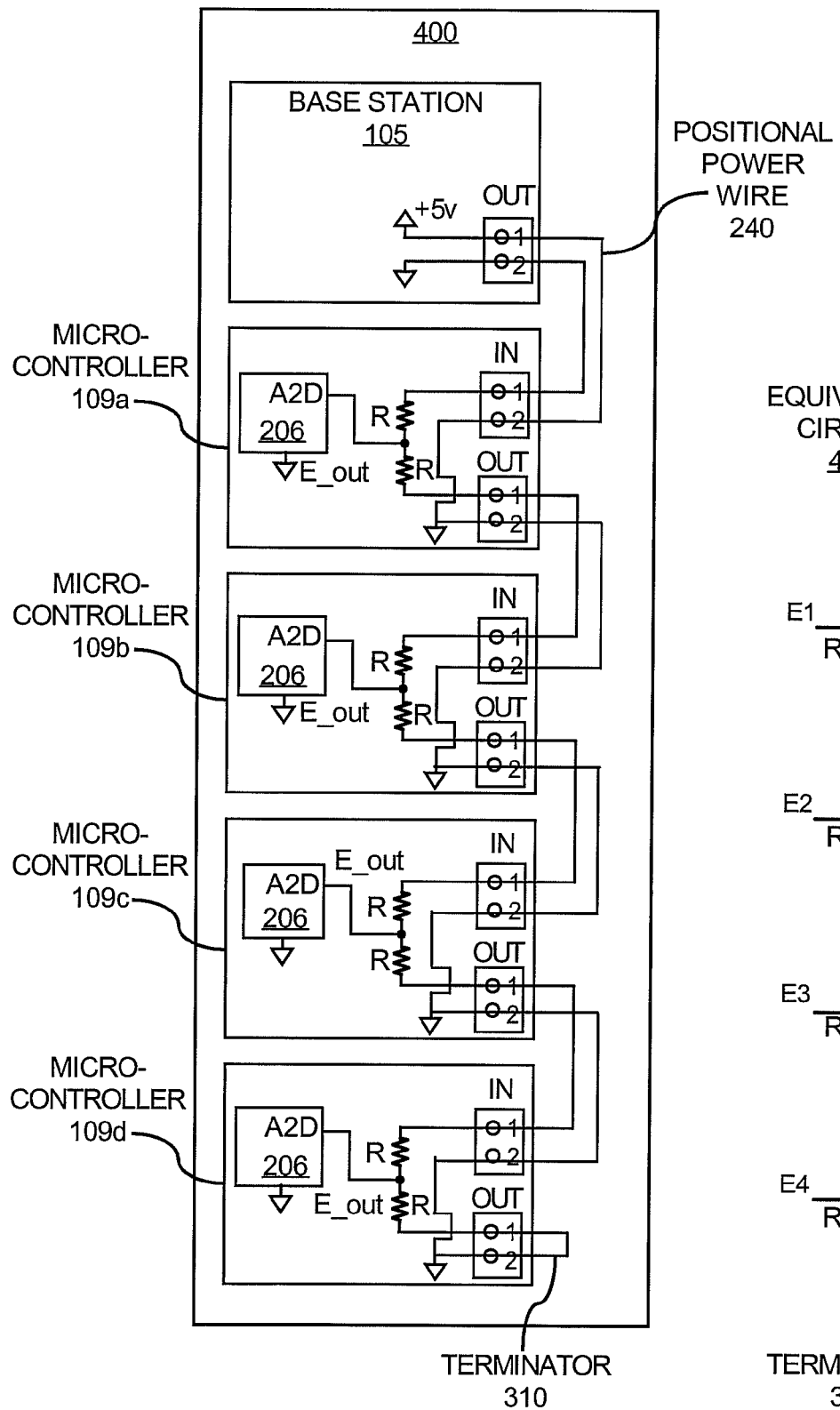

With reference now to FIG. 4A, there is shown a block diagram of a system 400 for identifying locations of the microcontrollers 109a-109n along the power and signal cable 111, according to another example. In addition, FIG. 4B depicts an equivalent circuit 420 to the system 400 depicted in FIG. 4A. As shown in FIG. 4A, the system 400 includes all of the same features as those depicted in FIG. 3A. As such, only those features that differ from FIG. 3A will be described with respect to FIG. 4A.

The microcontrollers 109a-109d depicted in FIG. 4A differ from the ones depicted in FIG. 3A in that a resistor ("R") is positioned in one of the positional power wires 240 supplying power to the PIC control FSM 206 and another resistor ("R") is positioned serially along the positional power wire 240 with the first resistor ("R"). The configuration depicted in FIG. 4A may be superior to the one depicted in FIG. 3A because the voltage measurements made by the PIC control FSM 206 will sequentially decrease along the positional power wire 240 regardless of whether the positional power wire 240 is inputted into the microcontrollers 109a-109d through the inputs ("in") or the outputs ("out"). As such, for instance, the level of precision required to connect the microcontrollers 109a-109d to the positional power wire 240 to accurately determine their locations may be relatively lower as compared with the level of precision required with the system 300 depicted in FIG. 3A.

With reference now to FIG. 5A, there is shown a block diagram of a system 500 for identifying locations of the microcontrollers 109a-109n along the power and signal cable 111, according to another example. In addition, FIG. 5B depicts an equivalent circuit 520 to the system 500 depicted in FIG. 5A. As shown in FIG. 5A, the system 500 includes all of the same features as those depicted in FIG. 4A. As such, only those features that differ from FIG. 4A will be described with respect to FIG. 5A.

The microcontrollers 109a-109d depicted in FIG. 5A differ from the ones depicted in FIG. 4A in that a third resistor ("R") is positioned along the line between the A2D converter and the two resistors ("R"). As shown, the third resistor ("R") is in parallel with the two resistors ("R"). This configuration is identical to the one depicted for the voltage reducer 210 in FIG. 2.

In any regard, the configuration depicted in FIG. 5A may be superior to the one depicted in FIGS. 3A and 4A because the voltage measurements made by the PIC control FSM 206 will sequentially decrease along the positional power wire 240 regardless of whether the positional power wire 240 is inputted into the microcontrollers 109a-109d through the inputs ("in") or the outputs ("out"). In addition, the configuration depicted in FIG. 5A does not require the use of a terminator 310. As such, for instance, the level of precision required to connect the microcontrollers 109a-109d to the positional power wire 240 to accurately determine their locations may be relatively lower as compared with the level of precision required with the system 300 depicted in FIG. 3A. In addition, the system 500 may be relatively easier to implement as compared with the systems 300 and 400.

Figure 6:
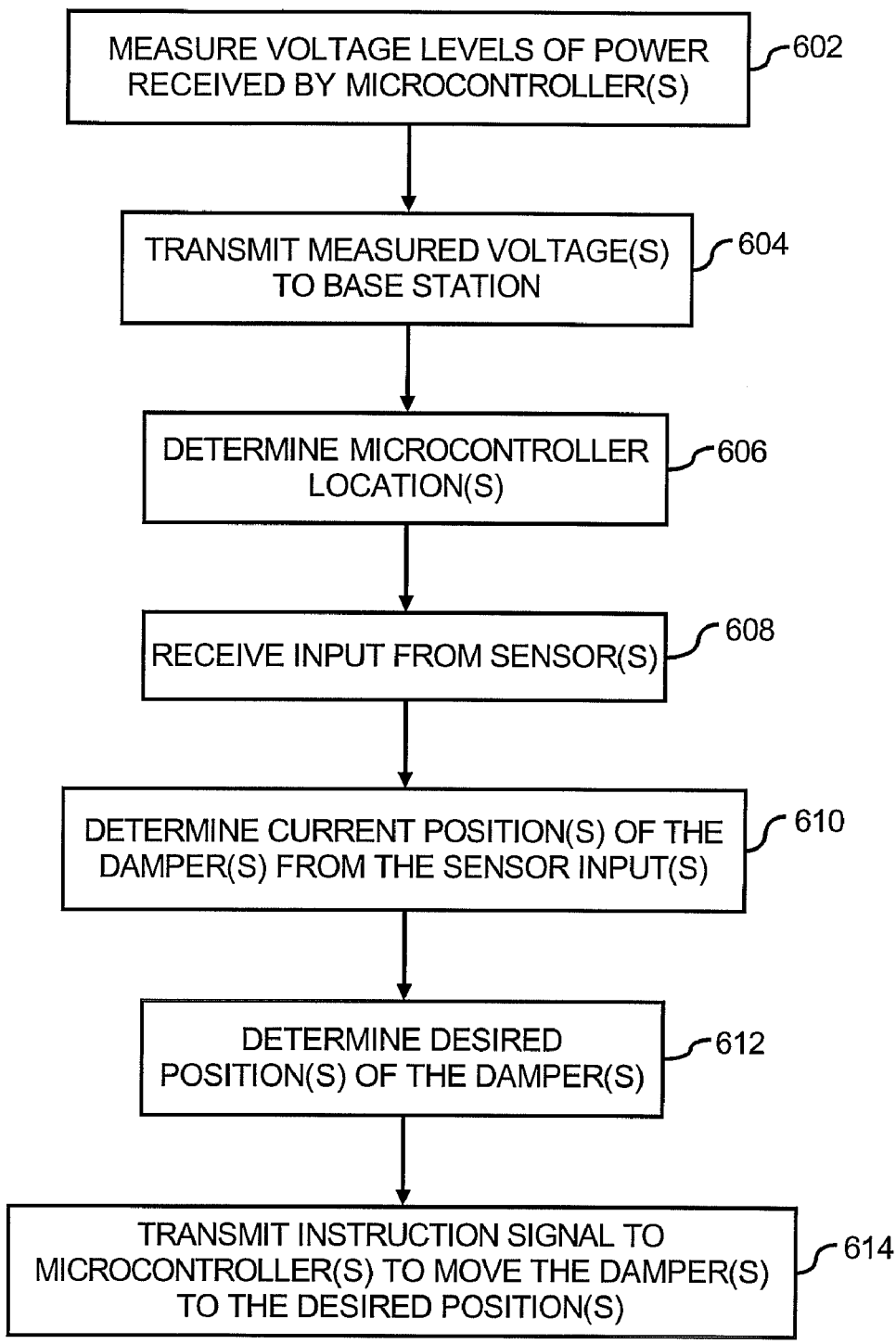
FIG. 6 shows a flow diagram of a method for controlling one or more actuators, according to an embodiment of the invention.

Turning now to FIG. 6, there is shown a flow diagram of a method 600 for controlling one or more actuators 107a-107n, according to an example. It is to be understood that the following description of the method 600 is but one manner of a variety of different manners in which an example of the invention may be practiced. It should also be apparent to those of ordinary skill in the art that the method 600 represents a generalized illustration and that other steps may be added or existing steps may be removed, modified or rearranged without departing from a scope of the method 600.

The description of the method 600 is made with reference to the elements of the control systems 100 and 200 depicted in FIGS. 1 and 2, and thus makes reference to the elements cited therein. It should, however, be understood that the method 600 is not limited to the elements set forth in FIGS. 1 and 2. Instead, it should be understood that the method 600 may be practiced by a system having a different configuration than that set forth in FIGS. 1 and 2.

Generally speaking, the method 600 may be implemented to control one or more actuators 107a-107n to thereby alter the position of one or more movable components, such as the dampers 110. As discussed above, the positions of the one or more dampers 110 may be altered automatically based upon input received from one or more of the sensors 212. Thus, the flow of cooling fluid may be automatically controlled with a relatively high level of granularity by selectively opening and closing the dampers 110 of individual AVTs 108a-108n to desired positions.

At step 602, the microcontrollers 109a-109n may measure the voltage levels respectively supplied thereto over the positional power wire 240. The voltage levels may be varied between different microcontrollers 109a-109n through implementation of one or more of the configurations depicted in FIGS. 3A-5A. In this regard, the microcontrollers 109a-109n may be positioned as shown in any one of FIGS. 3A, 4A, and 5A.

At step 604, the microcontrollers 109a-109n may transmit the measured voltages to the base station 105 through implementation of the single wire controller 220 and the single wire bus 230. The base station 105 may determine the locations of the microcontrollers 109a-109n along the power and signal cable 111 based upon their respective measured voltage levels, as indicated at step 606. The base station 105 may additionally store the microcontroller 109a-109n locations along with their identities in a memory (not shown).

At step 608, the PIC control FSM 206 of one or more of the microcontrollers 109a-109n may receive input from one or more of the sensors 212. For example, a PIC control FSM 206 may receive input from a motion sensor 212, such as an accelerometer. The input received from the motion sensor 212 may include a voltage reading indicating that a damper 110 is in a predefined position. In any regard, the PIC control FSM 206 may store this information in the PIC register file 208 and/or this information may be communicated to the base station 105.

At step 610, the PIC microcontroller 202 having the PIC control FSM 206 may determine the current position of the damper 110 from the sensor input. The current position of the damper 110 may be determined, for instance, by correlating the voltage reading received at step 608 to voltage readings obtained during a self-configuration process which may have been performed prior to step 608, as discussed above.

At step 612, the PIC microcontroller 202 of one or more microcontrollers 109a-109n may determine the desired positions of one or more dampers 110, according to a first example. In this example, the PIC microcontrollers 202 may be programmed to individually control their respective actuators 107a-107n depending upon, for instance, one or more conditions. As an example, the PIC microcontroller 202 may be programmed to activate the actuators 107a-107n at various times during a day, at various time intervals, in response to various external conditions, etc.

According to another example, however, at step 612, the base station 105 and/or the server 101 may determine the desired positions of the one or more dampers 110. In this example, the desired position(s) may be transmitted to selected ones of the microcontrollers 109a-109n through the power and signal cable 111, and more particularly through the single wire bus 230 and the single wire controller 230, as indicated at step 614. As discussed above, the base station 105 may have previously determined the locations of the microcontrollers 109a-109n and may thus individually control the microcontrollers 109a-109n. In this regard, the base station 105 and/or the server 101 may selectively instruct the microcontrollers 109a-109n to control their respective actuators 107a-107n to effectuate local or global changes in cooling fluid distribution in a data center, for instance. In addition, one or more of the actuators 107a-107n may be operated to move their respective dampers 110 in response to the detected rotational positions of the dampers 110 not equaling the desired rotational positions.

Some or all of the operations set forth in the method 600 may be contained as a utility, program, or subprogram, in any desired computer accessible medium. In addition, the method 600 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 7:
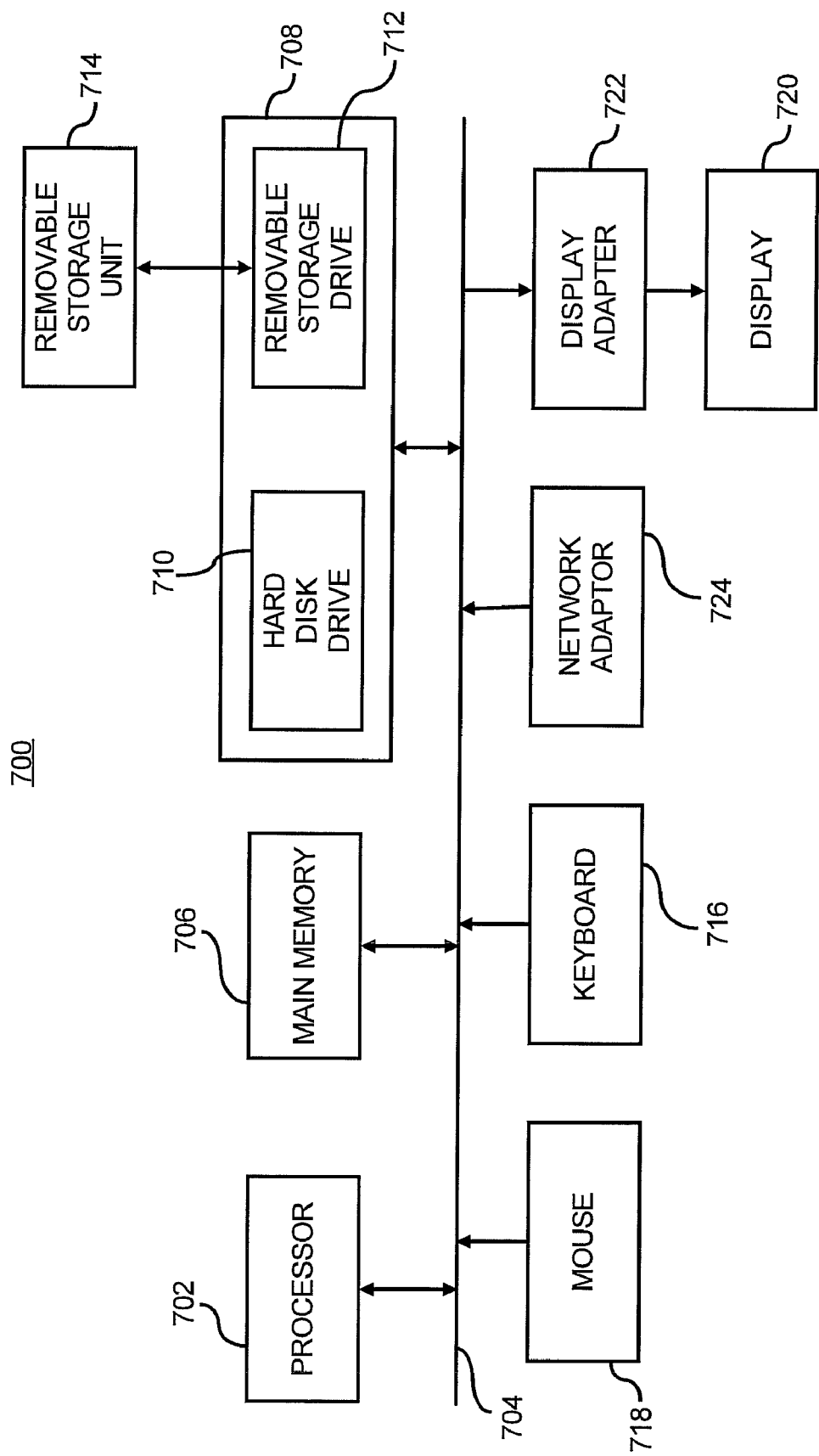
FIG. 7 illustrates a computer system, which may be employed to perform various functions of either or both of a base station and a server described herein, according to an embodiment of the invention.

FIG. 7 illustrates a computer system 700, which may be employed to perform the various functions of the base station 105 and/or the server 101 described herein above, according to an example. In this respect, the computer system 700 may be used as a platform for executing one or more of the functions described hereinabove with respect to either or both of the base station 105 and the server 101.

The computer system 700 includes a processor 702 that may be used to execute some or all of the steps described in the method 600. Commands and data from the processor 702 are communicated over a communication bus 704. The computer system 700 also includes a main memory 706, such as a random access memory (RAM), where the program code for, for instance, the base station 105, may be executed during runtime, and a secondary memory 708. The secondary memory 708 includes, for example, one or more hard disk drives 710 and/or a removable storage drive 712, representing a floppy diskette drive, a magnetic tape drive, a compact disk drive, etc., where a copy of the program code for determining the locations of the microcontrollers 109a-109n and for controlling one or more of the actuators 107a-107n may be stored. In addition, information pertaining to at least one of the locations and the identities of the microcontrollers 109a-109n may also be stored in at least one of the main memory 706 and the secondary memory 708.

The removable storage drive 710 may read from and/or write to a removable storage unit 714 in a well-known manner. User input and output devices may include, for instance, a keyboard 716, a mouse 718, and a display 720. A display adaptor 722 may interface with the communication bus 704 and the display 720 and may receive display data from the processor 702 and convert the display data into display commands for the display 720. In addition, the processor 702 may communicate over a network, for instance, the Internet, LAN, etc., through a network adaptor 724.

It will be apparent to one of ordinary skill in the art that other known electronic components may be added or substituted in the computer system 700. In addition, the computer system 700 may include a system board or blade used in a rack in a data center, a conventional "white box" server or computing device, etc. Also, one or more of the components in FIG. 7 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A microcontroller for controlling an actuator, said microcontroller comprising:

a single wire controller configured to receive data and power from a base station through a single wire bus, wherein the single wire bus is part of a power and signal cable configured to connect the microcontroller to the base station; and a peripheral interface controller (PIC) microcontroller configured to transmit data signals to and receive data signals from the single wire controller, wherein the PIC microcontroller is configured to receive a reduced voltage from a power wire of the power and signal cable, to measure the voltage level and to communicate the measured voltage level to the base station through the single wire bus.

2. The microcontroller according to claim 1, wherein the PIC microcontroller comprises:
   a communication unit configured to enable data signal communication with the single wire controller;
   a PIC control finite state machine (FSM) configured to measure the received voltage; and
   a PIC register file configured to store data received from the base station and the PIC control FSM.

3. The microcontroller according to claim 1, wherein the PIC microcontroller is configured to receive input from at least one sensor configured to detect the rotational position of a movable component.

4. The microcontroller according to claim 3, wherein the actuator is configured to vary the rotational position of the movable component and wherein the PIC microcontroller is further configured to control the actuator to vary the rotational position of the movable component to a desired position based upon the detected rotational position of the movable component.

5. The microcontroller according to claim 1, wherein the power and signal cable comprises at least six wires, one of said six wires comprising the single wire bus, a second one of the six wires providing positional power to the PIC microcontroller, a third one of the six wires providing power to the microcontroller and the PIC microcontroller, and at least one of the three remaining wires grounding the first, second and third wires.

6. The microcontroller according to claim 5, further comprising:
   an input for receiving the second one of the six wires into the PIC microcontroller;
   an output for outputting the second one of the six wires from the PIC microcontroller; and
   a voltage reducer, wherein the voltage reducer is positioned along the second one of the six wires, to thereby reduce a voltage level supplied into the PIC microcontroller through the input.

7. The microcontroller according to claim 6, wherein the voltage reducer comprises at least one resistor positioned along the second one of the wires between the input and the output.

8. The microcontroller according to claim 6, wherein the voltage reducer comprises a two serially arranged resistors positioned along the second one of the wires between the input and the output, and wherein the PIC microcontroller is configured to receive power along a wire from a junction point between the two serially arranged resistors.

9. The microcontroller according to claim 8, wherein the voltage reducer further comprises a third resistor positioned in parallel with the two serially arranged resistors along the wire from the junction point to the PIC microcontroller.

* * * * *